US012324996B2

(12) United States Patent
Girondi (10) Patent No.: US 12,324,996 B2
(45) Date of Patent: Jun. 10, 2025

(54) FILTRATION ASSEMBLY INCLUDING A FILTERING CARTRIDGE AND A FILTER BODY

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

( * ) Notice: Subject to any disclaimer, the term of this patent is extended or adjusted under 35 U.S.C. 154(b) by 800 days.

(21) Appl. No.: 17/632,772

(22) PCT Filed: Jul. 29, 2020

(86) PCT No.: PCT/IB2020/057136
§ 371 (c)(1),
(2) Date: Feb. 3, 2022

(87) PCT Pub. No.: WO2021/024099
PCT Pub. Date: Feb. 11, 2021

(65) Prior Publication Data
US 2022/0258078 A1 Aug. 18, 2022

(30) Foreign Application Priority Data
Aug. 7, 2019 (IT) .......................... 102019000014292

(51) Int. Cl.
  *B01D 35/30* (2006.01)
  *B01D 29/13* (2006.01)
  *B01D 29/96* (2006.01)

(52) U.S. Cl.
  CPC .............. *B01D 29/96* (2013.01); *B01D 29/13* (2013.01); *B01D 35/30* (2013.01);
  (Continued)

(58) Field of Classification Search
  CPC .............. B01D 35/30; B01D 2201/295; B01D 2201/305; B01D 2201/4007; B01D 2201/4015; B01D 2201/4084
  See application file for complete search history.

(56) References Cited

U.S. PATENT DOCUMENTS 11,845,026 B2 * 12/2023 Girondi .................. B01D 29/11

FOREIGN PATENT DOCUMENTS

| WO | 2004/091750 A1 | 10/2004 |
| WO | 2018/162835 A1 | 9/2018 |
| WO | 2020/026059 A1 | 2/2020 |

OTHER PUBLICATIONS

International Search Report and Written Opinion of the International Searching Authority for International Patent Application No. PCT/IB2020/057136 mailed Nov. 5, 2020, 9 pages.

(Continued)

*Primary Examiner* — Bradley R Spies
(74) *Attorney, Agent, or Firm* — Merchant & Gould P.C.

(57) ABSTRACT

A filtration assembly of a fluid of a vehicle extending along an axis includes a filtering cartridge and a filter body housing the filtering cartridge. The filtration assembly includes cartridge members and body members having engagement and disengagement configurations, respectively. The filtering cartridge includes an axial end plate on which the cartridge members are positioned. The cartridge members include blocking groups, each including a stem and a tooth projecting laterally and defining an engagement undercut. The body members include a housing region and a lug. In the engagement configuration, the tooth housed snap-fits in a respective housing region and the lug is housed in the undercut. The cartridge members and the body members include a cartridge border and a body border, to reciprocally engage in the reciprocal rotary actions so that the respective blocking group yields elastically radially in the reciprocal engagement between cartridge border and body border.

17 Claims, 13 Drawing Sheets

(52) U.S. Cl.
CPC .. *B01D 2201/295* (2013.01); *B01D 2201/302* (2013.01); *B01D 2201/305* (2013.01); *B01D 2201/4007* (2013.01); *B01D 2201/4076* (2013.01); *B01D 2201/4084* (2013.01)

(56) References Cited

OTHER PUBLICATIONS

Italian Search Report for Italian Patent Application No. 102019000014292 mailed Mar. 10, 2020, 2 pages.

\* cited by examiner

FILTRATION ASSEMBLY INCLUDING A FILTERING CARTRIDGE AND A FILTER BODY

This application is a National Stage Application of PCT/IB2020/057136, filed 29 Jul. 2020, which claims benefit of Serial No. 102019000014292, filed 7 Aug. 2019 in Italy, and which applications are incorporated herein by reference. To the extent appropriate, a claim of priority is made to each of the above-disclosed applications.

FIELD OF APPLICATION

The present invention relates to a filtration assembly of a vehicle.

The present invention preferably falls in the automotive field. Specifically, the background in which the present invention falls indeed is the one of systems for filtering a fluid, with particular reference to the fluids, liquids or gases required for the operation of a motor vehicle. In other words, the filtration assembly of a fluid and the components forming it as per the present invention are applied in air circuits, oil circuits, fuel circuits and/or water (or aqueous solution) circuits, in the ventilation circuits of the compressed blow-by gases in a vehicle.

Filtration assemblies of a fluid in automotive applications are well known in the field of the art.

The known filtration assemblies comprise one (or more) filtering cartridges integrally connected, and in certain cases also fluidically connected, to a respective filter body. In the present disclosure, "filter body" means any component (or group of components) inside of which the filtering cartridge is housable and preferably is fluidically connectable.

A particularly felt problem in the known filtration assemblies is the one of making the operating connection between said filtering cartridges and said filter bodies in such a way that it is secure, for example such as to avoid possible mutual disconnections, but which simultaneously is easy to make and repeat so as to allow simple and intuitive replacement and/or maintenance operations.

Indeed, the designers in the known solutions find themselves having to choose one of the two needs, sacrificing the other.

Solution of the Invention

Therefore, the object of the present invention is to provide a filtration assembly that ensures the secure blocking of the filtering cartridge with the respective filter body while having secure, simple and intuitive engagement and disengagement operations.

DESCRIPTION OF THE FIGURES

Further features and advantages of the invention will be apparent from the following description of preferred and non-limiting embodiments thereof, with reference to the accompanying Figures, in which.

DETAILED DESCRIPTION

Reference numeral 900 in the accompanying Figures indicates a filtration assembly as a whole according to the present invention. Axis X-X shows the extension direction along which and about which said filtering assembly 1 and the related components extend.

Moreover, numeral 1 indicates a filtering cartridge and numeral 2 indicates a filter body.

The filtering cartridge 1 and the filter body 2 preferably in turn extend along and about axis X-X.

The filter body 2 in particular comprises therein a filtration chamber 20 in which the filtering cartridge 1 is housable.

According to a preferred embodiment, the filter body 2 comprises a cap body 21 and a cup body 22 in which the reciprocal engagement, preferably along axis X-X, defines the filtration chamber 20.

The cap body 21 preferably comprises a cap collar 210 having substantially annular extension engageable, preferably sealingly, by the cup body 22.

According to the object of the present invention, the filtering cartridge 1 and the filter body 2 are specifically suitable to be engaged and disengaged to/from each other.

The filtration assembly 900 in particular further comprises engagement/disengagement means 3 comprising cartridge members 4 comprised in the filtering cartridge 1 and body members 5 comprised in the filter body 2.

The cartridge members 4 and the body members 5 are respectively specifically shaped to be configurable in an engagement configuration by means of a reciprocal rotational action with respect to axis X-X and in a disengagement configuration by means of a reciprocal axial or rotational action about axis X-X.

In other words, as extensively shown in the accompanying Figures, the cartridge members 4 and the body members 5 are reciprocally engageable in a snap-fit manner by means of a rotary action.

Figure 1:
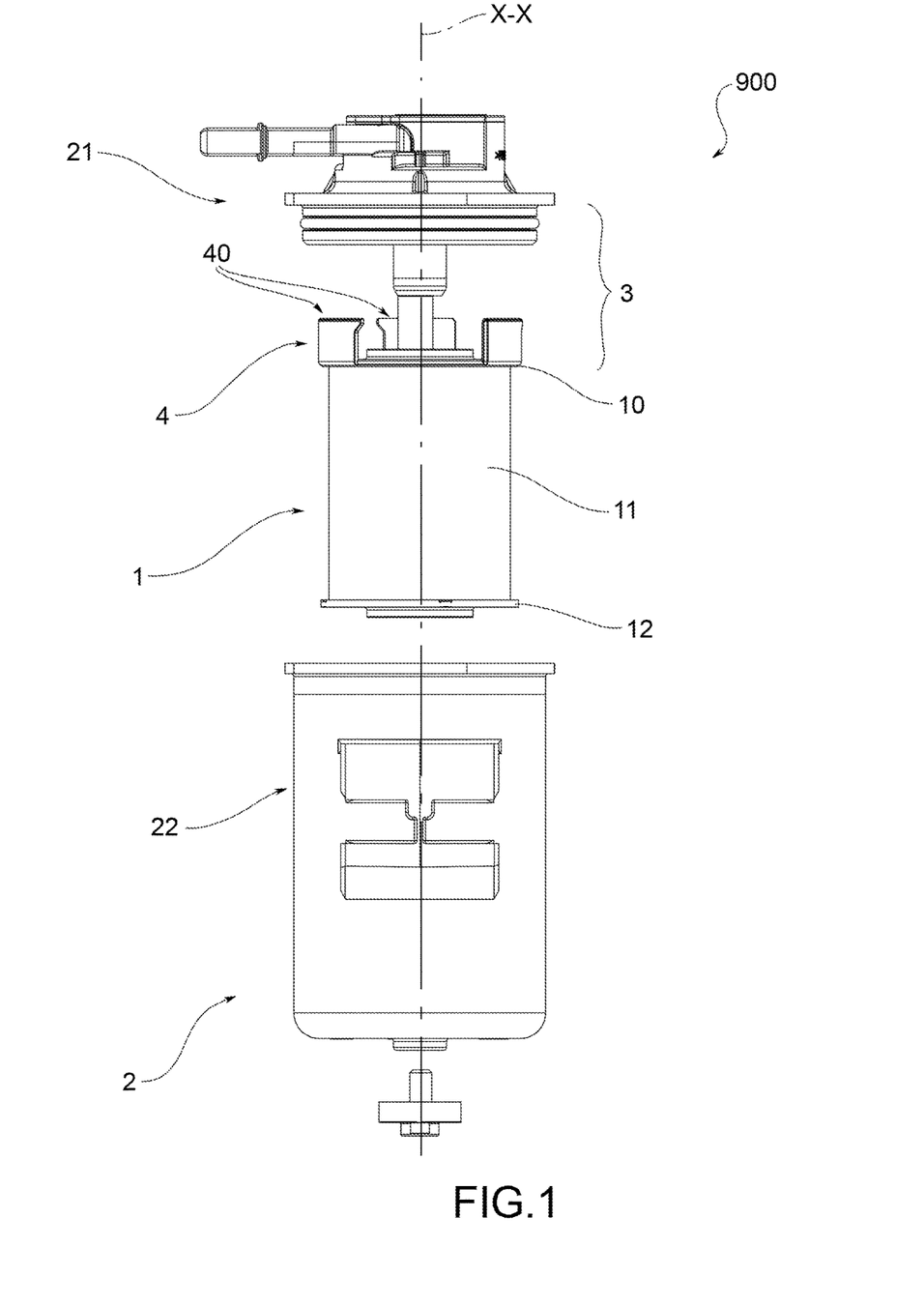
FIG. 1 shows a side view with separate parts of the filtration assembly according to the present invention, according to a preferred embodiment.
Figure 2A:
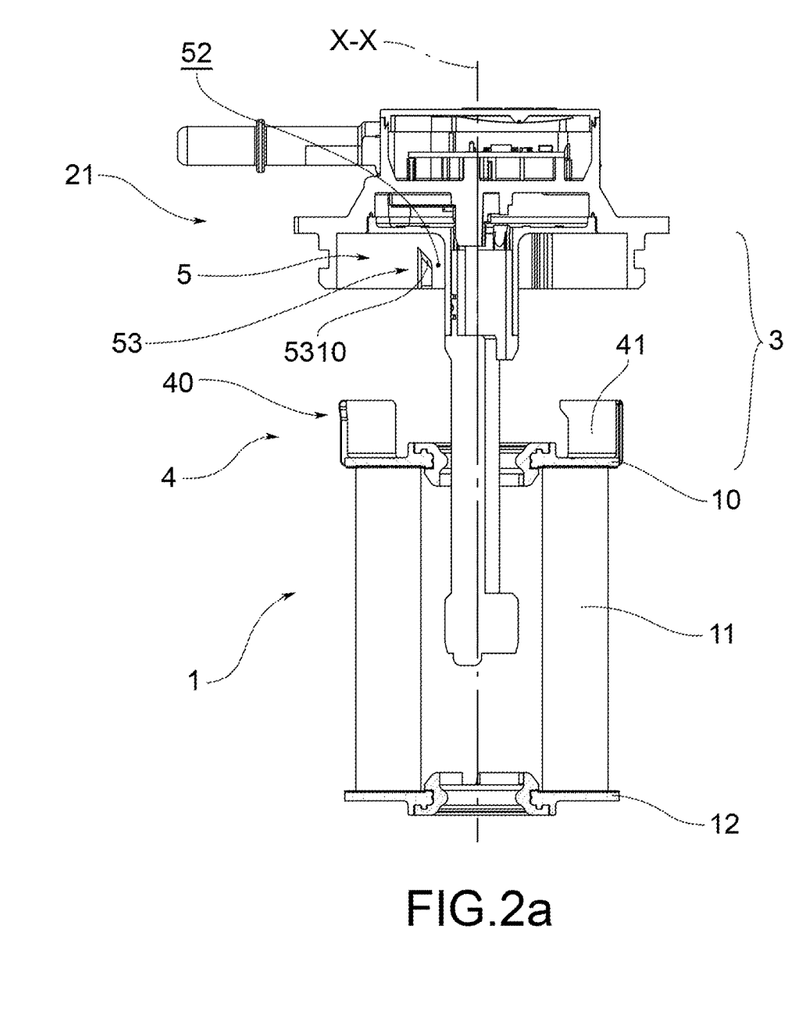
FIGS. 2a, 2b, 2c, 2d, 2e and 2f show a cross section of the filtration assembly in FIG. 1, in respective engagement and disengagement steps between a filtering cartridge and a filter body; they in particular show a disengagement configuration in axial approaching step, an axial positioning configuration, a rotation configuration, an engagement configuration, an assembled configuration, an axial release configuration.
Figure 2B:
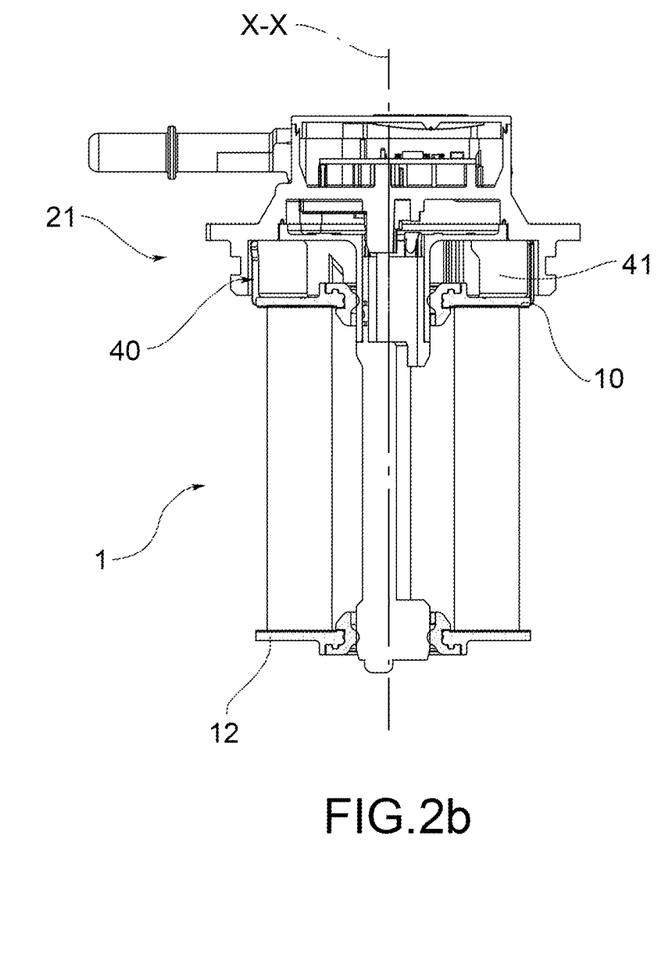
Figure 2C:
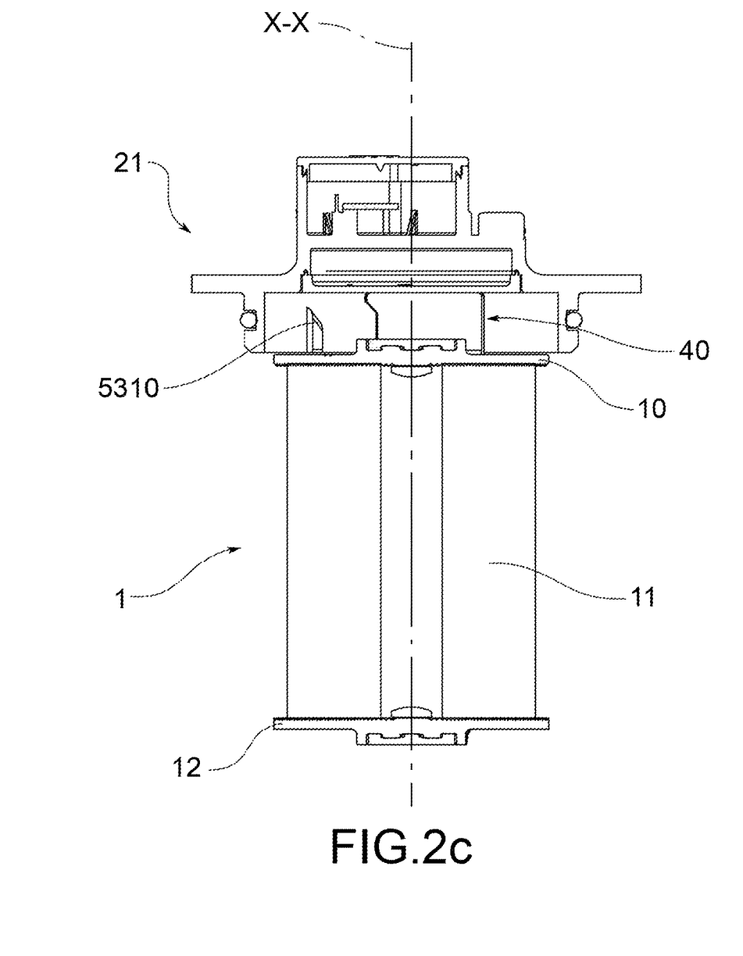
Figure 2D:
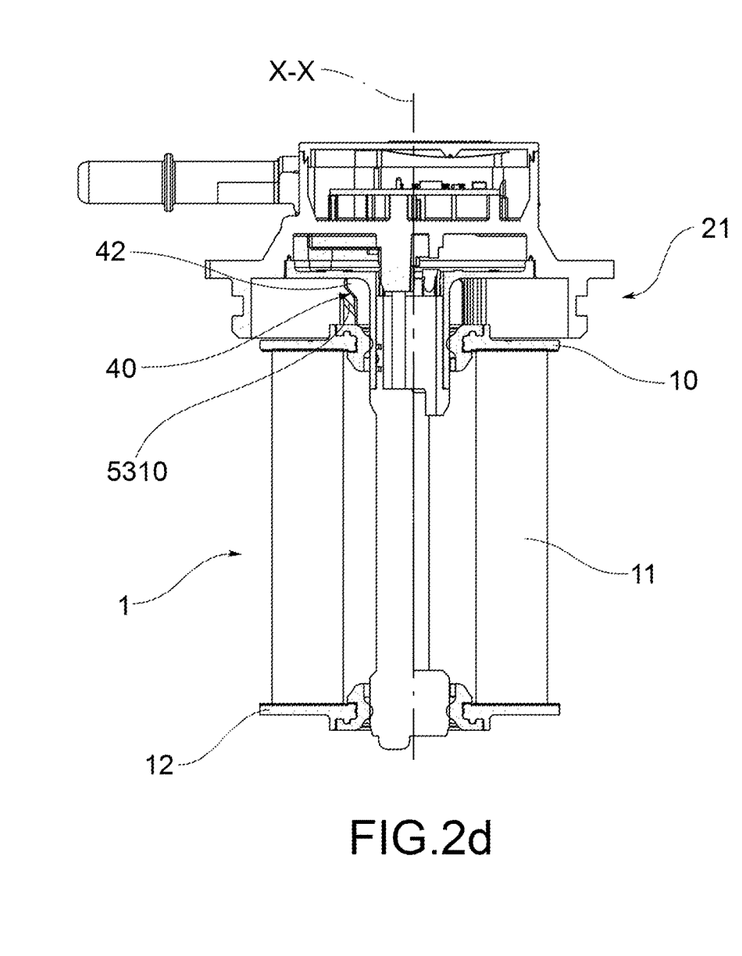
Figure 2E:
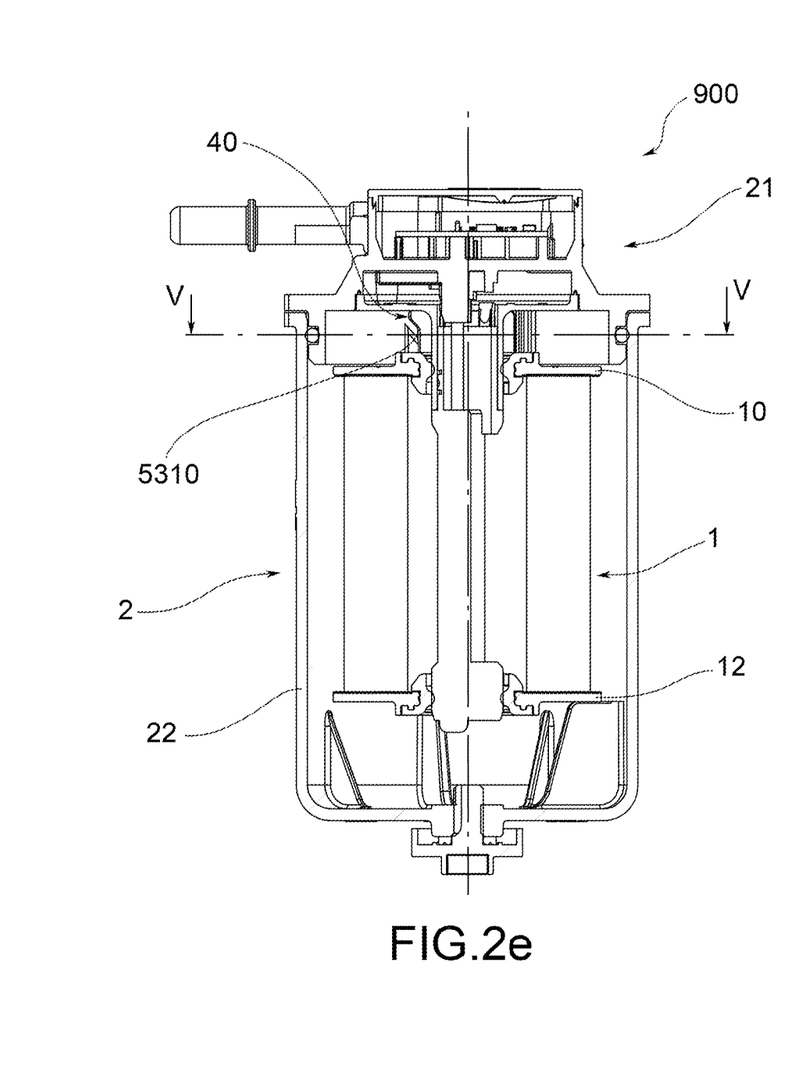
Figure 2F:
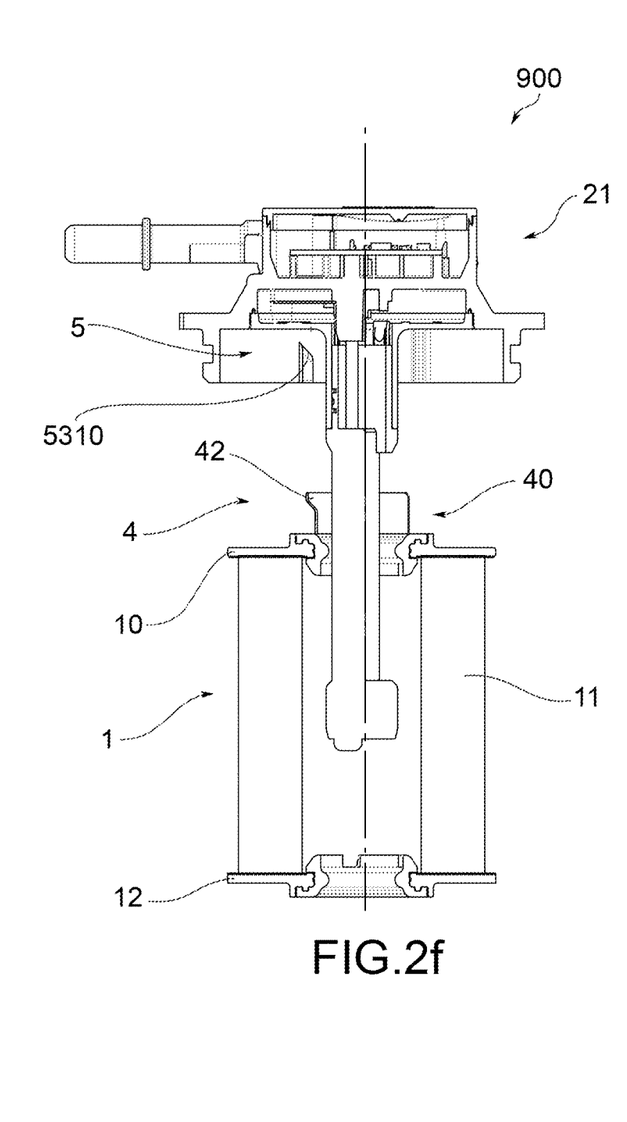
Figure 3:
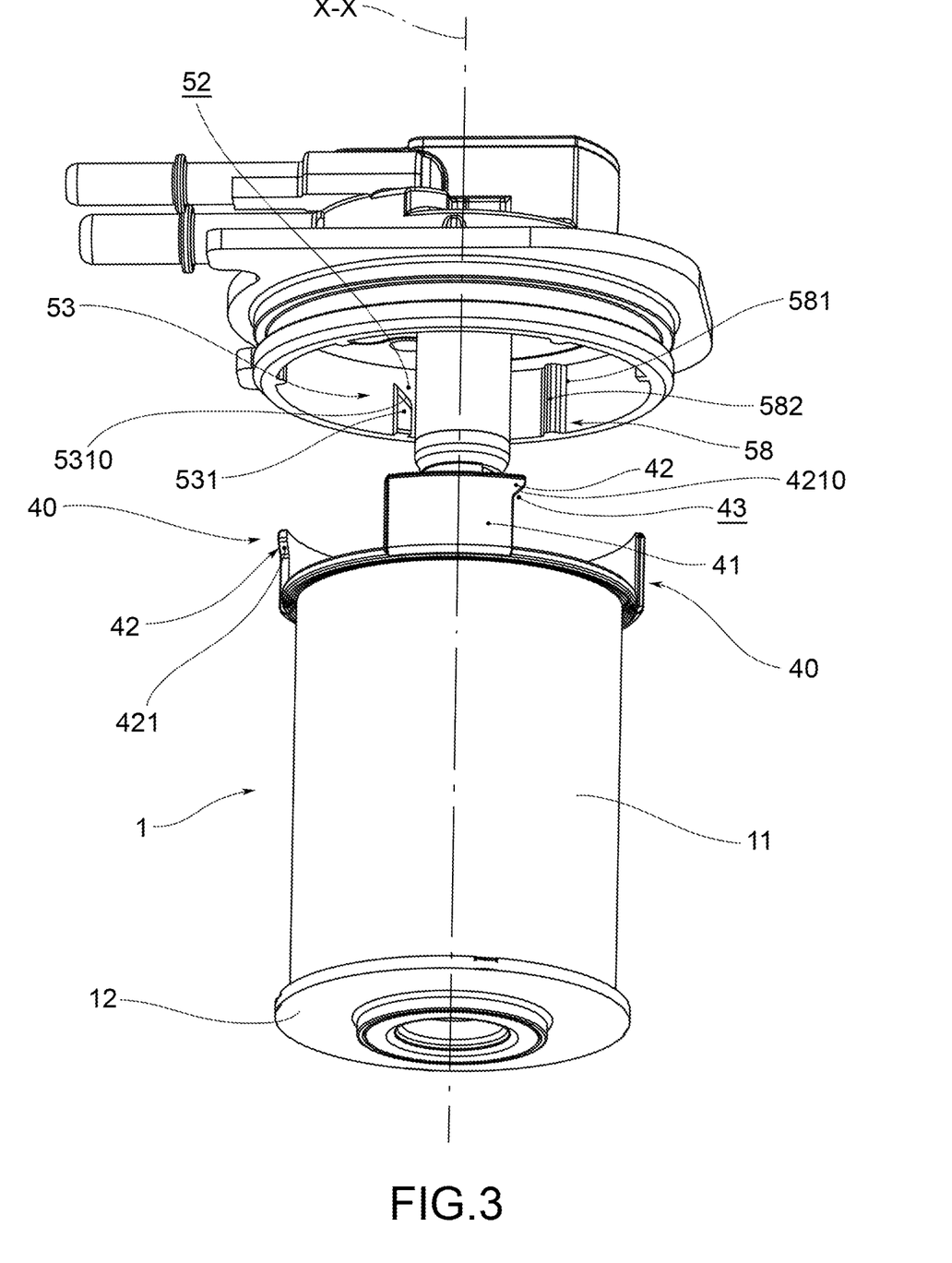
FIG. 3 shows a perspective view with separate parts of the filtration assembly according to the present invention.
Figure 4:
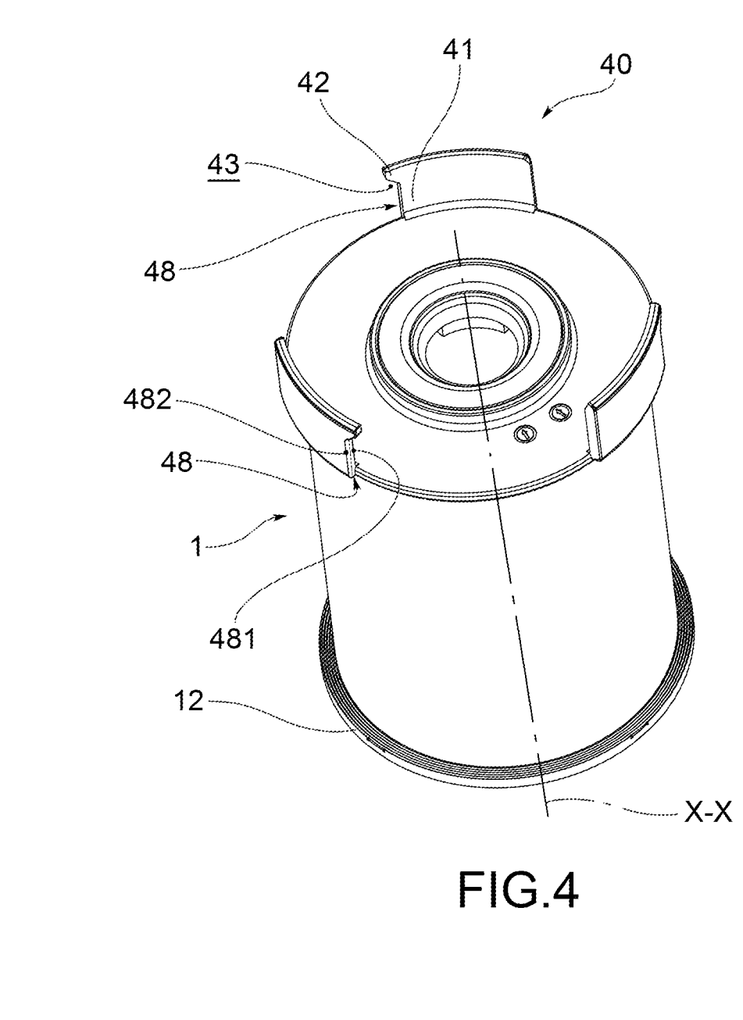
FIG. 4 shows a perspective view of the filtering cartridge comprised in the filtration assembly in FIG. 1.

In the embodiment shown by way of example in FIGS. 1 to 4, the reciprocal disengagement action is executable by means of an extraction in axial direction, excluding any other type of action resulting in the reciprocal release.

Figure 5:
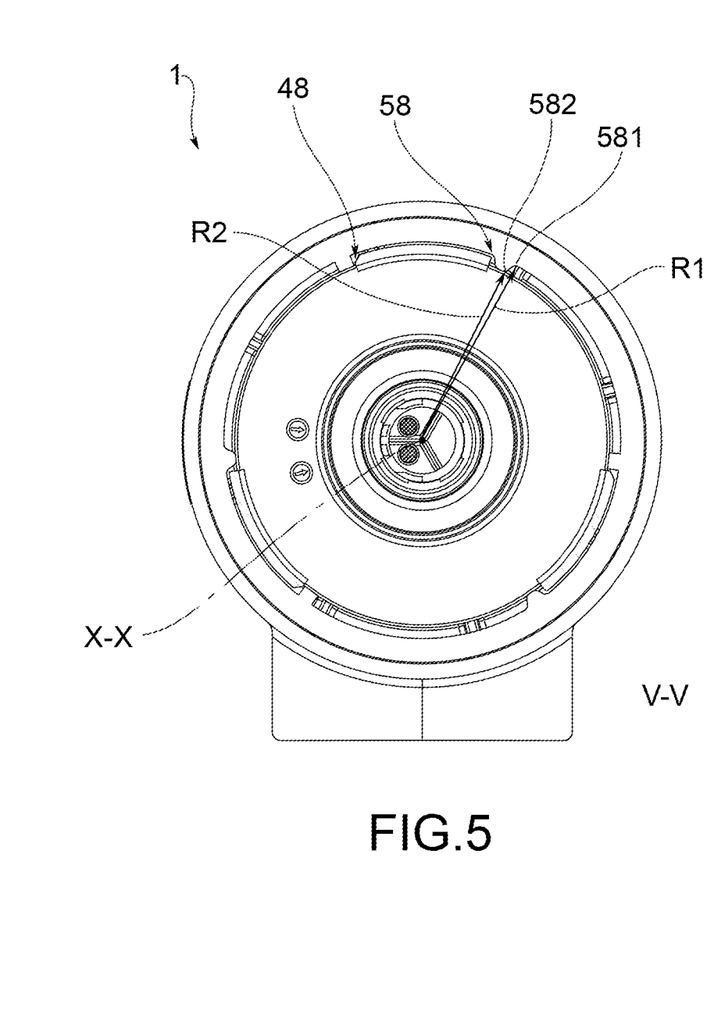
FIG. 5 shows a sectional view along the sectional plane V-V in FIG. 2e.
Figure 6:
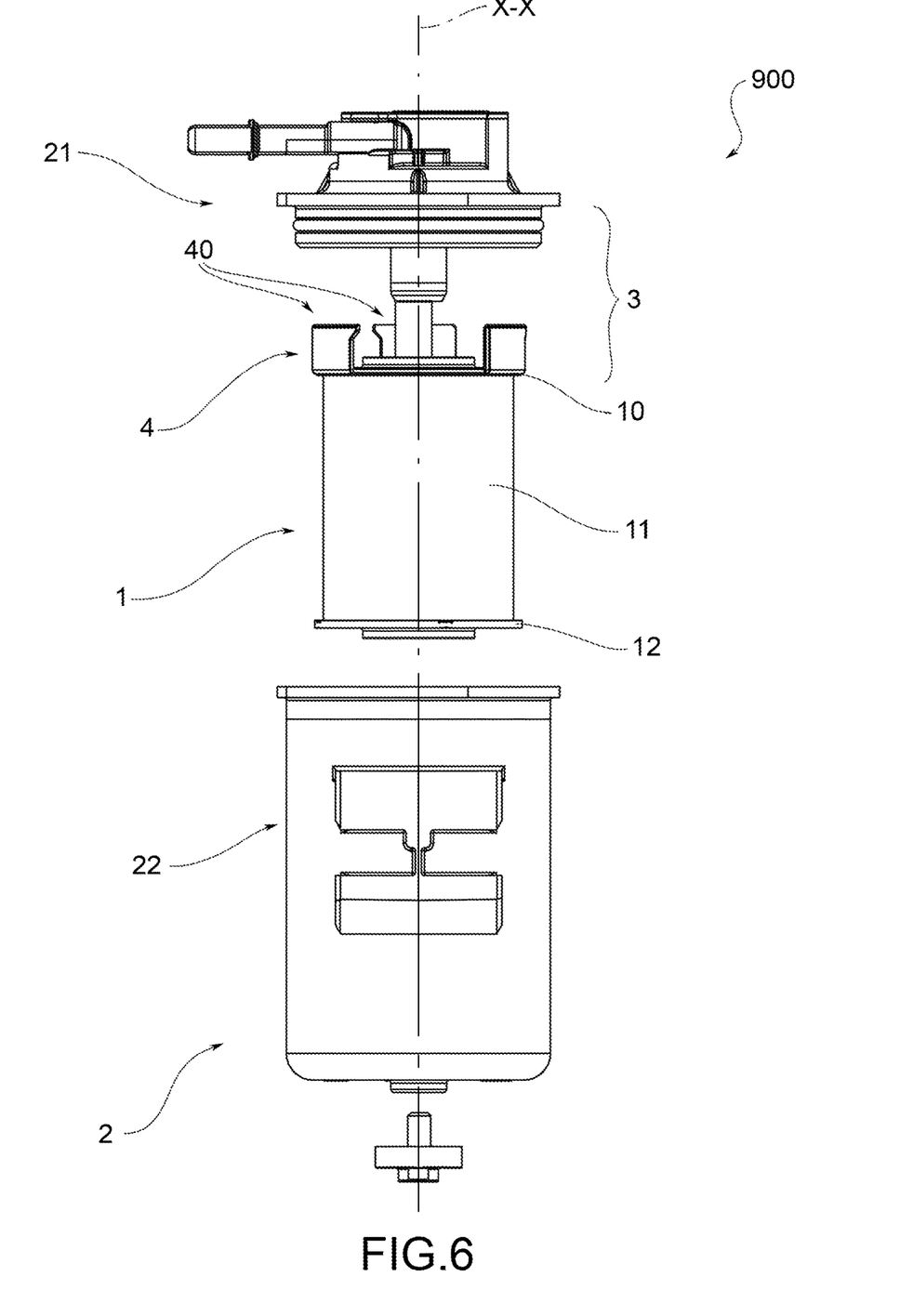
FIG. 6 shows a side view with separate parts of the filtration assembly according to the present invention, according to a further embodiment.
Figure 7A:
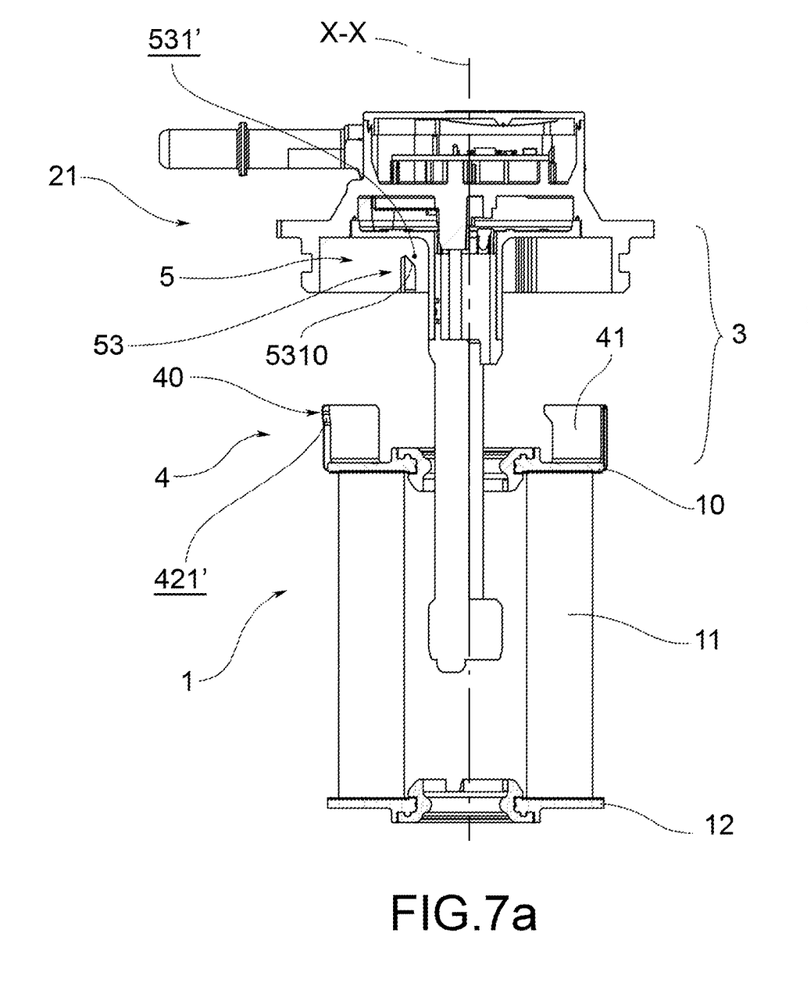
FIGS. 7a, 7b, 7c, 7d, 7e and 7f show a cross section of the filtration assembly in FIG. 6, in respective engagement and disengagement steps between a filtering cartridge and a filter body; they in particular show a disengagement configuration in axial approaching step, an axial positioning configuration, a rotation configuration, an engagement configuration, an assembled configuration, a rotational release configuration.
Figure 7B:
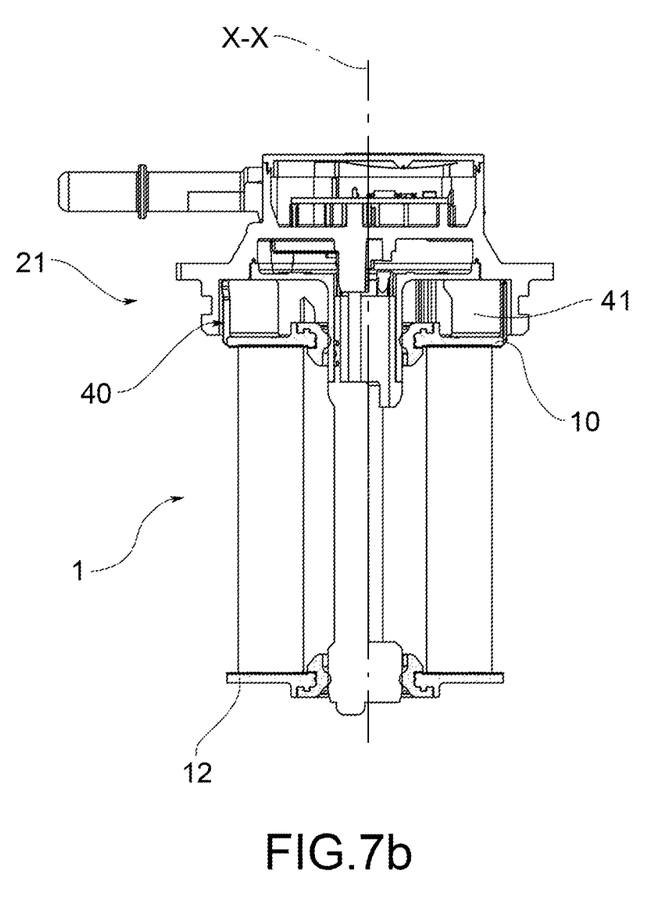
Figure 7C:
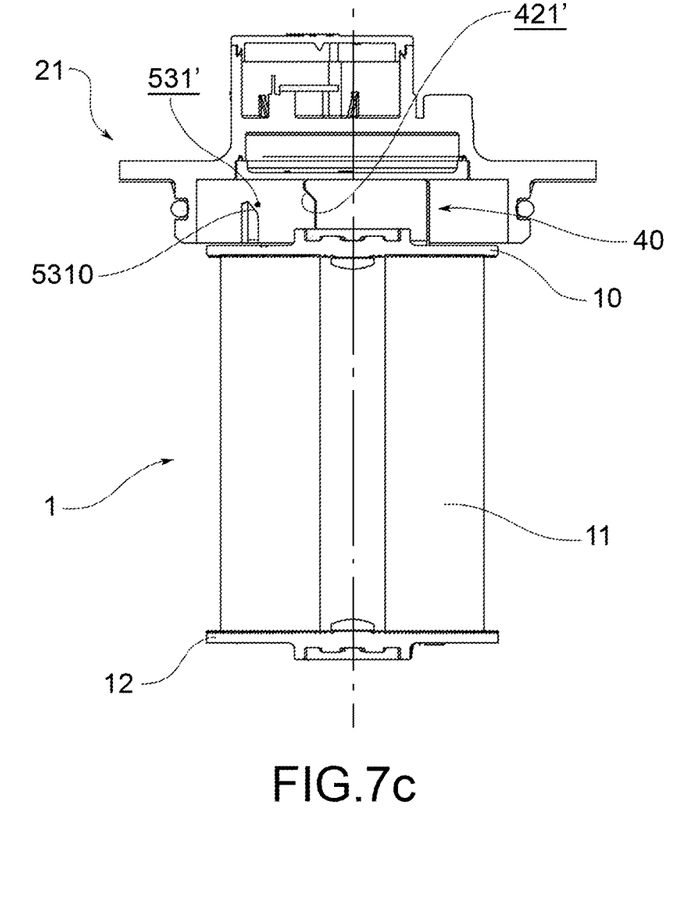
Figure 7D:
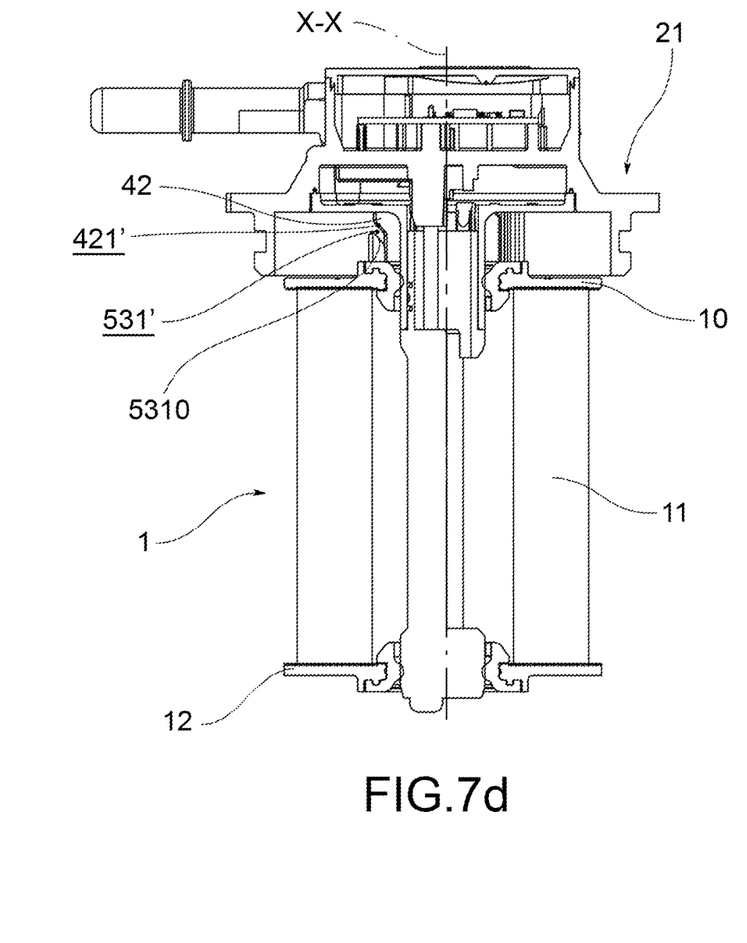
Figure 7E:
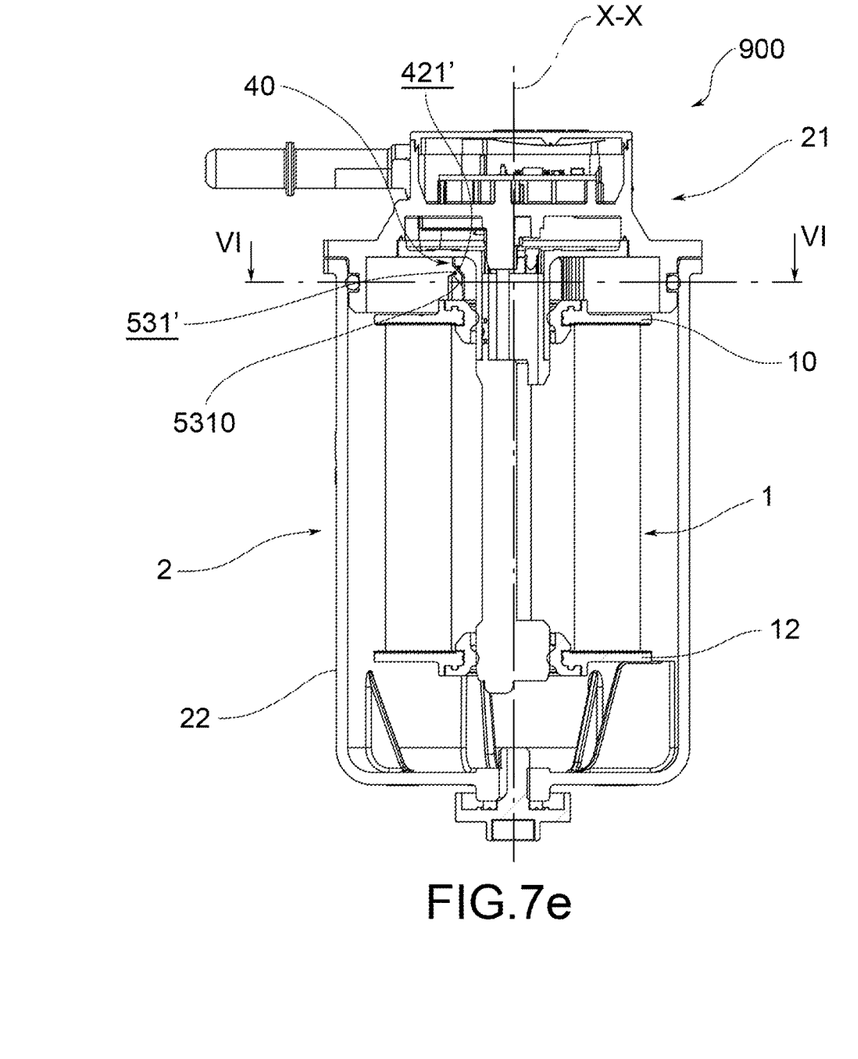
Figure 7F:
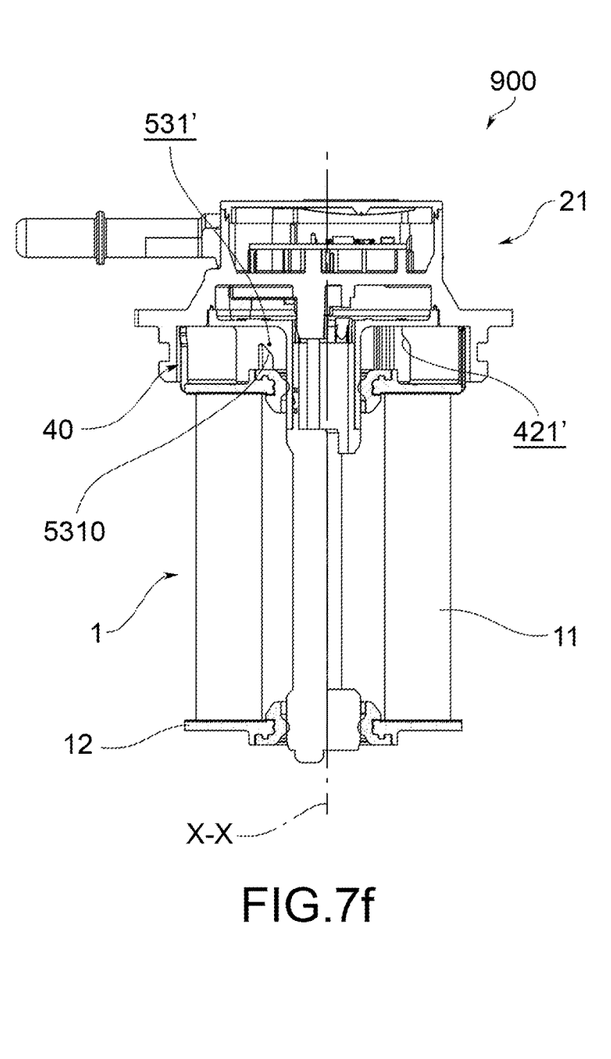
Figure 8:
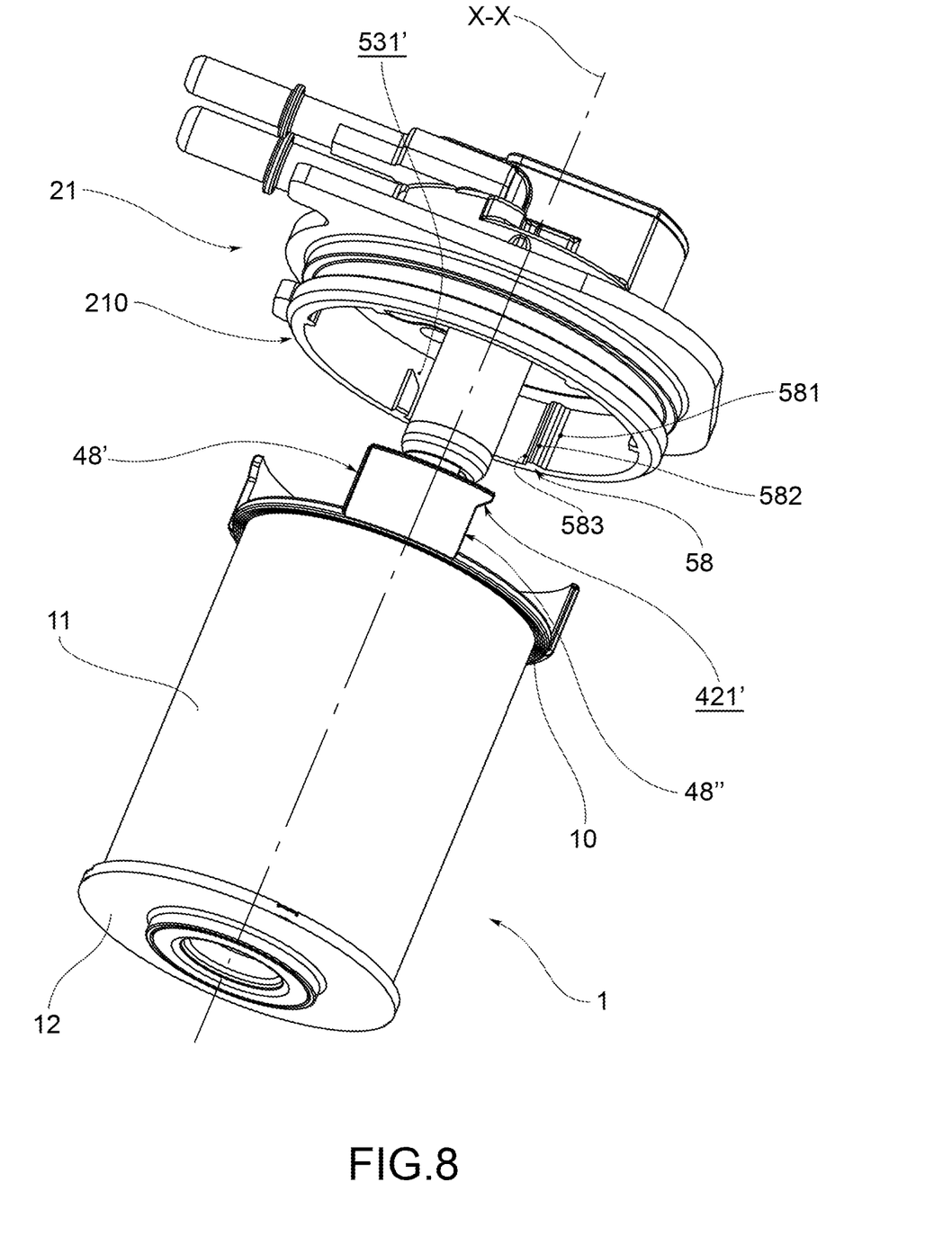
FIG. 8 shows a perspective view with separate parts of the filtration assembly according to the present invention.

In the embodiment shown by way of example in FIGS. 5 to 8, the reciprocal disengagement action is executable by means of an extraction in rotary direction, opposite to the rotary direction which results in the engagement, excluding any other type of action resulting the reciprocal release.

In the present description, the engagement/disengagement operations exclusively mean the operations resulting in the reciprocal engagement between cartridge members 4 and body members 2 or resulting in the reciprocal disengagement between cartridge members 4 and body members 2. In certain preferred embodiments, such operations need further approaching or distancing operations upstream or downstream (in axial direction and/or in rotary direction), which are required for the complete execution of the engagement/disengagement operations.

According to a preferred embodiment, the filtration assembly 900 further comprises objectivization elements required to cause the reciprocal angular position of the respective cartridge members and body members and to ensure the correct execution of the reciprocal engagement or disengagement steps in axial direction. Said objectivization elements preferably are housed on various components involved in the aforesaid operations, for example the filtering cartridge 1 and/or the filter body 2.

According to a preferred embodiment, the filtering cartridge 1 comprises an end plate 10, a filtering medium 11, preferably of hollow cylindrical type radially crossable by the fluid, and a secondary end plate 12.

According to the present invention, the cartridge members 4 are positioned, preferably comprised, in said end plate 10.

The cartridge members 4 preferably extend substantially parallel and about axis X-X.

Specifically, the cartridge members 4 indeed comprise at least two angularly spaced, preferably equidistant, blocking groups 40.

The cartridge members 4 preferably comprise three or four angularly spaced, preferably equidistant, blocking groups 40.

According to a preferred embodiment, said blocking groups 40 lie on an imaginary plane, which extends radially spaced with respect to axis X-X. In other words, the blocking groups 40 are substantially planar, curved.

According to a preferred embodiment, the blocking groups 40 are angularly equally spaced from axis X-X.

According to a preferred embodiment, the blocking groups 40 are all positioned at the same distance from axis X-X.

According to one embodiment variant, each blocking group 40 has a respective distance from axis X-X.

According to present invention, each blocking group 40 comprises a stem 41 and a tooth 42.

Tooth 42 is positioned at the axial end of stem 41 projecting therefrom in a lateral direction, that is, in a circumferential or tangential direction, defining, with stem 41, an engagement undercut 43.

In other words, stem 41 and tooth 42 give the blocking group 40, which lies on the respective imaginary plane, a substantially "L" shape.

The body members 5 are positioned and shaped complementarily to the cartridge members 4.

Indeed, the body members 5 preferably comprise at least one housing region 52 and a lug 53.

According to the present invention, in the engagement configuration, tooth 42 is housed in a snap-fit manner in the respective specifically shaped housing region 52.

According to the present invention, in the engagement configuration, lug 53 is housed in undercut 43.

According to a preferred embodiment, the housing region 52 also houses stem 41 of the respective blocking group 40.

The respective tooth 42 preferably is housed in the housing region 52, but in certain preferred embodiments, the whole blocking group 40, that is both tooth 42 and stem 41, are housed in the housing region 52.

Moreover, according to the present invention, the cartridge members 4 and the body members 5 comprise a cartridge border 48 and a body border 58.

The cartridge border 48 and the body border 58 in particular extend substantially along axis X-X.

The cartridge border 48 preferably is the outer side border of the blocking group 40. The body border 58 preferably laterally delimits the housing region 52 which it faces.

Said body border 58 preferably extends parallel to axis X-X in a lateral position defining the housing region 52.

In a preferred embodiment, the body border 58 is positioned angularly (circumferentially) facing lug 53.

According to the present invention, the cartridge border 48 and the body border 58 are suitable to reciprocally engage in the rotary actions between filtering cartridge 1 and filter body 2.

Indeed, at least one between the cartridge border 48 and the body border 58 is specifically shaped, identifying a ramp. The remaining border therefore preferably is suitable to slide on said ramp (during the rotary disengagement operations). The remaining border therefore in particular is suitable to slide on said ramp (during the rotary engagement or disengagement operations), thus causing the elastic bending of the blocking group 40 in radial direction, allowing the inlet of each tooth 42 into the related housing region 52 or allowing the outlet of each tooth 42 from the related housing region 52.

According to the present invention indeed, the shaped border, which identifies the ramp, comprises a first edge radially distal to axis X-X and a second edge radially proximal from axis X-X.

According to the present invention, the respective blocking group 40 yields elastically in a radial direction in the reciprocal engagement between cartridge border 48 and body border 58, whereby tooth 42 enters the respective housing region 52. In other words, due to the shaped border, the blocking group 40 is insertable in a snap-fitted manner into the body members 5 by means of a rotary operation.

Preferably, the shaped border that identifies the ramp indeed comprises a first edge and a second edge having different radial distance from axis X-X, in which the first edge is radially spaced from axis X-X by a first radial distance r1, while the second edge is radially spaced from axis X-X by a second radial distance r2. The value of said second radial distance r2 is less than the value of said first distance r1.

According to an embodiment variant, both the cartridge border 48 and the body border 58 are complementarily shaped, each identifying a ramp comprising a first edge radially distal to axis X-X and a second edge radially proximal from axis X-X.

According to a preferred embodiment, at least one between the cartridge border 48 and the body border 58 is shaped, identifying the ramp, while the other has a substantially curved or squared shape to allow the sliding thereof on the ramp.

In the accompanying Figures, the cartridge border 48 comprises a first cartridge edge 481 and a second cartridge edge 482.

In the accompanying Figures, the body border 58 comprises a first body edge 581 and a second body edge 582.

In a preferred embodiment, the cartridge border 48 is positioned on stem 41.

In a preferred embodiment, the cartridge border 48 is positioned on tooth 42.

In an embodiment variant, the cartridge border 48 is positioned both on stem 41 and on tooth 42.

According to the present invention, the body border 58 is positioned circumferentially in front of lug 53. In other words, according to a preferred embodiment, the blocking group 40 is housed between lug 53 and the body border 58, in the blocking configuration.

According to the first embodiment, the body border 58 comprises a first body edge 581 and a second body edge 582.

Moreover, according to one embodiment variant, the respective blocking group 40 yields elastically in a radial direction in the reciprocal engagement between cartridge border 48 and body border 58, whereby tooth 42 leaves the respective housing region 52. In other words, due to the shaped border, the blocking group 40 snap-fitted into the body members 5 is extractable by means of a rotary operation opposite to the insertion operation.

According to a preferred embodiment, the body border is shaped as a double ramp, comprising a first body edge 581 radially distal to axis X-X and a second body edge 582 radially proximal from axis X-X and a third body edge 583 radially distal to axis X-X.

According to such a preferred embodiment, the first ramp is therefore defined by the first body edge 581 and by the second body edge 582 and the second ramp is defined by the second body edge 582 and by the third body edge 583.

In such preferred embodiment, the blocking group 40 preferably comprises a first cartridge border 48' and a second cartridge border 48" in such a way that the first cartridge border 48' engages the first ramp and the second cartridge border 48" engages the second ramp. Each cartridge border has the above-described features.

In other words, substantially two specifically shaped cartridge borders are identified, for example positioned at the two sides of the blocking group 40, for example at the two sides of stem 41, each suitable to engage one of the two ramps in the rotational operations.

Moreover, according to such a preferred embodiment, as mentioned it is worth noting that said third edge 583 is radially spaced from axis X-X by a third distance r3. The value of said third radial distance r3 preferably is greater than the value of said second distance r2. The value of said third radial distance r3 preferably substantially is equal to the value of said first distance r1.

According to a preferred embodiment, each tooth 42 comprises a tilted cartridge edge 421 in such a way as to have a tapered shape in a lateral direction.

Said tilted cartridge edge 421 preferably faces undercut 43.

According to a preferred embodiment, each lug 53 comprises a tilted protruding edge 531 specifically shaped similarly to the tilted cartridge edge 421.

Said tilted protruding edge 531 preferably faces the housing region 52.

According to a preferred embodiment, the tilted cartridge edge 421 and the tilted protruding edge 531 comprise a cartridge engagement wall 4210 and a lug engagement wall 5310, respectively.

In a preferred embodiment, the cartridge engagement wall 4210 and the lug engagement wall 5310 are preferably lying on an imaginary plane tilted with respect to an imaginary plane orthogonal to axis X-X in such a way as to allow the reciprocal slipping of tooth 42 on lug 53 in an axial pulling action.

According to a preferred variant embodiment, such walls are shaped to allow the slipping of the respective tooth 42 on the respective lug 53, with related radial bending of the blocking group 40, to allow the disengagement operation in axial direction.

I.e., in such a preferred embodiment therefore, the disengagement operation occurs in axial direction parallel to axis X-X.

Such an embodiment preferably is therefore the one in which the body border 58 has a "single ramp".

Such an embodiment preferably is therefore the one shown in FIGS. 1 to 5.

In an embodiment variant, the cartridge engagement wall 4210 and the lug engagement wall 5310 are preferably lying on an imaginary plane parallel or slightly tilted with respect to an imaginary plane orthogonal to axis X-X in such a way as to prevent the slipping of tooth 42 on lug 53 in an axial pulling action.

In other words, in a configuration with the cartridge members 4 and the body members 5 engaged, the cartridge engagement wall 4210 and the lug engagement wall 5310 are such as to discharge any axial pulling actions onto each other.

According to a preferred embodiment, the cartridge engagement wall 4210 and the lug engagement wall 5310 are orthogonal to axis X-X.

According to a further preferred embodiment, the cartridge engagement wall 4210 and the lug engagement wall 5310 are tilted with respect to axis X-X, identifying a cartridge retaining undercut 421' and a lug retaining undercut 531' suitable to house a portion of lug 53 and of tooth 52, respectively. In further other words, in an engagement configuration, tooth 42 and lug are shaped to penetrate each other by creating an irremovable snap-coupling between cartridge and filter body 2 by means of an axial pulling action in direction contrary to the one with which the engagement is created. According to the present invention, only the described reciprocal engagement between cartridge borders and body borders allows the release of the coupling and the uncoupling between said components.

Such an embodiment preferably is therefore the one in which the body border 58 has a "double ramp".

Figure 9:
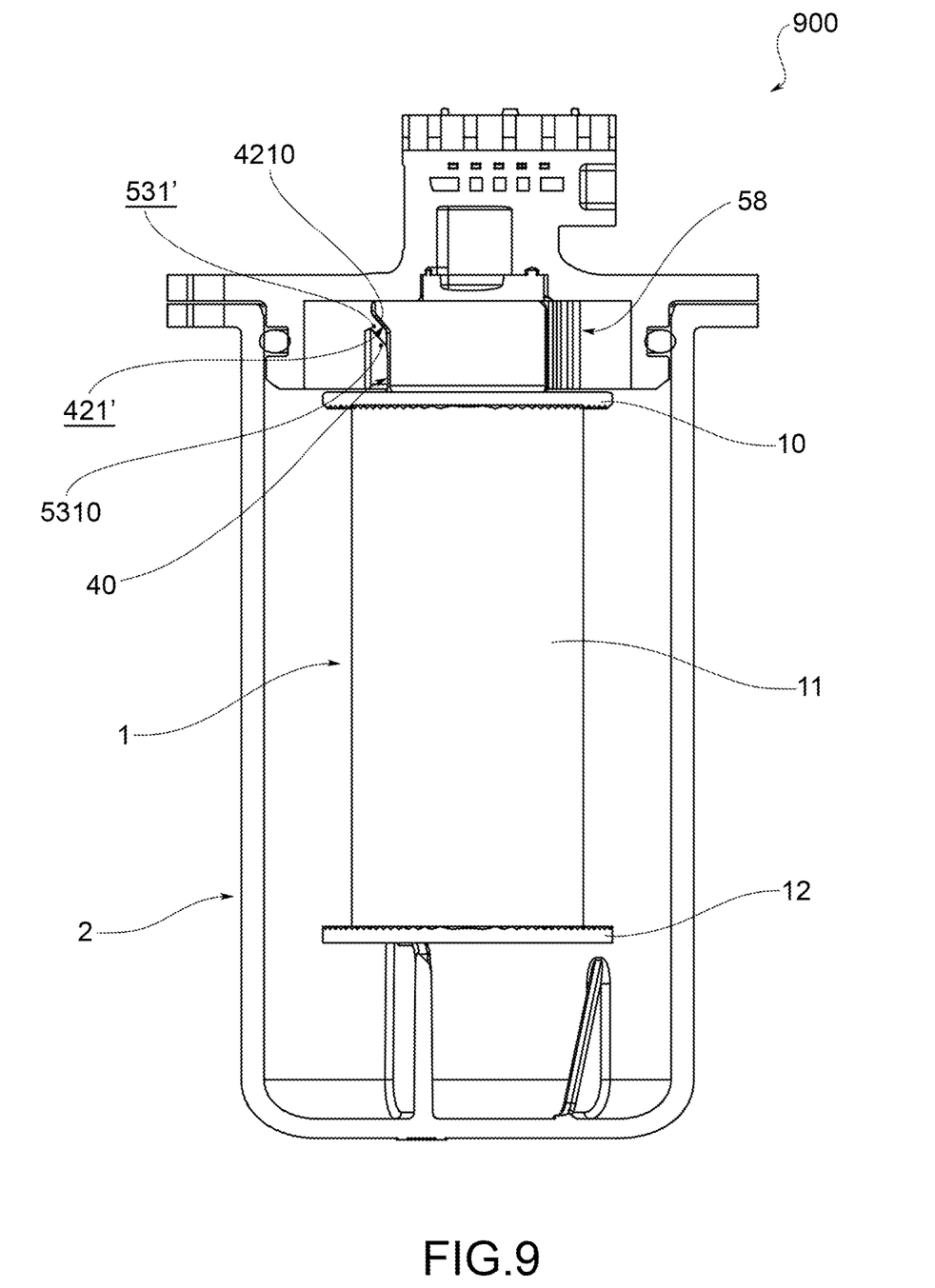
FIG. 9 shows a detailed sectional view of the filtration assembly in FIG. 8, in an assembled configuration.
Figure 10:
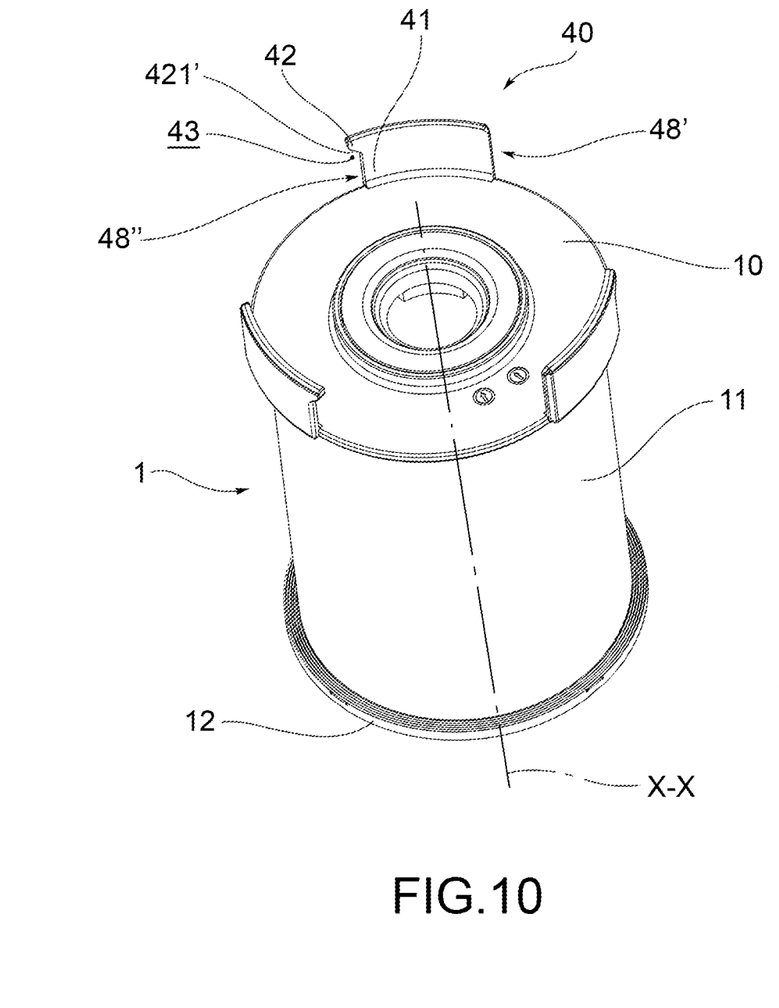
FIG. 10 shows a perspective view of the filtering cartridge comprised in the filtration assembly in FIG. 8.
Figure 11:
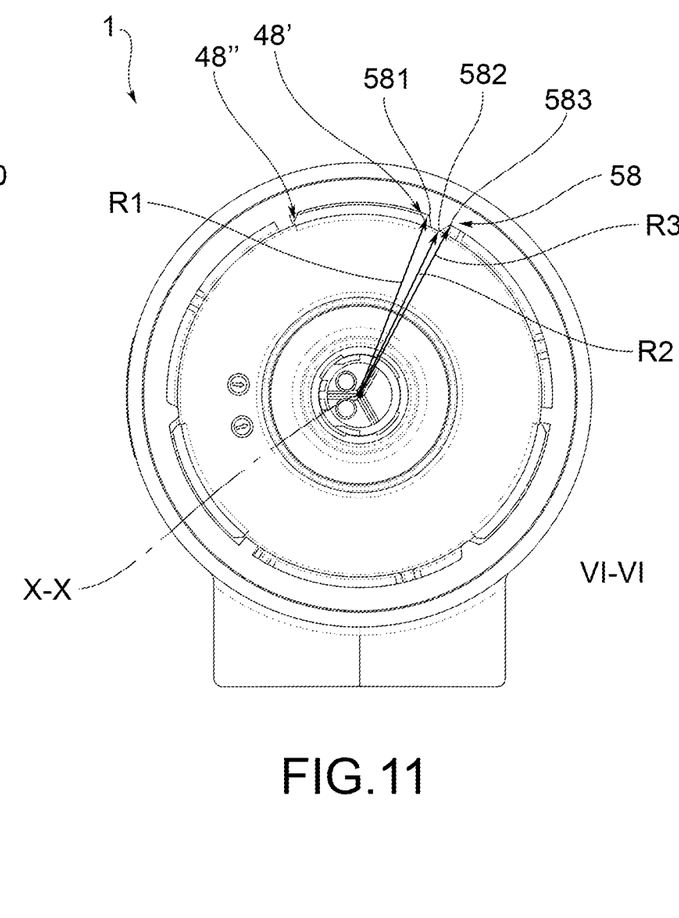
FIG. 11 shows a sectional view along the sectional plane VI-VI in FIG. 7e.

Such an embodiment preferably is therefore the one shown in FIGS. 6 to 11.

Innovatively, the above-described filtering assembly of a fluid of a vehicle amply fulfills the object of the present invention, overcoming typical problems of the prior art.

Indeed, the engagement operations between filtering cartridge and filter body advantageously provide a single reciprocal rotation step.

Indeed, the engagement operations between filtering cartridge and filter body advantageously provide a single reciprocal rotation step. Instead, the disengagement operations advantageously provide either a rotational extraction action or an axial extraction action. The engagement/disengagement operations thus are suitable to the various maintenance operations.

The engagement and disengagement operations of the two components advantageously are substantially guided and therefore error-proof.

The filtering cartridge-filter body engagement and disengagement operations advantageously are highly simplified and intuitive.

In the engagement configuration, the engagement/disengagement means advantageously ensure the fixed and secure axial positioning of the two components, which is also maintained over time.

The axial blocking action achieved by the respective teeth advantageously is carried out in an effective and reliable manner.

Due to the tilted borders, the axial blocking action advantageously is discharged onto the complementary components provided on the filter body in an effective manner.

The geometry of the coupling system advantageously is simplified by simplifying the sizing of the teeth and of the respective seats and advantageously minimizing the complexity of the molds used to make the engagement/disengagement means, and the related costs.

A further advantage of the present invention therefore lies in the fact that the installation is not allowed, on filter bodies, of filtering cartridges not equipped with blocking groups as the ones described. In other words, cartridges, e.g. traditional cartridges, are not employable in the filtering group, thus ensuring, for example during maintenance operations, that filtering cartridges with quality ensured by the manufacturer are used.

The engagement/disengagement means advantageously have a small axial size, allowing a maximization of the filtering surface of the filtering septum, thus meeting the needs of the specific filtration group.

The engagement/disengagement means described advantageously are easy to implement on filtering cartridges having various sizes and diameter.

The engagement/disengagement means described advantageously are easy to implement on end plates having various shapes, thus allowing the implementation of the coupling system both on cylindrical cartridges and on cartridges having a main extension direction, for example with rectangular or elliptic end plates and on irregular-shaped plates.

The engagement means advantageously have a small radial size and are providable both on filtering cartridges involved by radial flow and on filtering cartridges involved by axial flow.

The filter body advantageously directly engages the filtering cartridge.

The engagement between filtering cartridge and filter body advantageously is employable for filtering devices in which the axis is vertically oriented, is horizontally oriented or is tilted with respect to the ground, under the conditions of use thereof.

It is apparent that those skilled in the art may make changes to the filtering cartridge, filter body, filtering group of a fluid or to the assembly method in order to meet contingent needs, all contained within the scope as defined by the following claims.

LIST OF REFERENCE NUMERALS 1 filtering cartridge
10 end plate
11 filtering medium
12 secondary end plate
2 filter body
20 filtration chamber
21 cap body
210 cap collar
22 a cup body
3 engagement/disengagement means
4 cartridge members
40 blocking group
41 stem
42 tooth
421 tilted cartridge edge
421' retaining undercut
4210 cartridge engagement wall
43 undercut
48 cartridge border
481 first cartridge edge
482 second cartridge edge
48' first cartridge border
48" second cartridge border
5 body members
52 housing region
53 lug
531 tilted protruding edge
531' lug retaining undercut
5310 lug engagement wall
58 body border
581 first body edge
582 second body edge
583 third body edge
900 filtration assembly
X-X main axis
r1 first radial distance
r2 second radial distance
r3 third radial distance

The invention claimed is:

1. A filtration assembly of a fluid of a vehicle extending along an axis and comprising:
    i) a filtering cartridge;
    ii) a filter body comprising a filtration chamber in which the filtering cartridge is housed;
    iii) engagement/disengagement members comprising cartridge members comprised in the filtering cartridge and body members comprised in the filter body, respectively shaped to be configurable in an engagement configuration by a reciprocal rotational action with respect to the axis and in a disengagement configuration by a reciprocal axial action or by a reciprocal rotational action around the axis;
    wherein the filtering cartridge comprises at an axial end an end plate on which said cartridge members are positioned extending substantially parallel and about the axis;
    wherein the cartridge members comprise at least two blocking groups, each comprising a stem and one tooth positioned at an axial end of the stem projecting laterally in a circumferential or tangential direction, defining with the stem an engagement undercut;
    wherein the body members comprise at least one housing region and a lug;
    wherein, in the engagement configuration, the tooth is housed in a snap-fit manner in the respective housing region, and the lug is housed in the undercut;
    wherein the cartridge members and the body members comprise a cartridge border and a body border to engage with each other in reciprocal rotary actions, wherein at least one of the cartridge border and the body border is shaped, identifying a ramp comprising a first edge radially proximal to the axis and a second edge radially distal from the axis;
    wherein, in the reciprocal engagement between the cartridge border and the body border, the respective blocking group yields elastically in a radial direction.

2. Filtration assembly according to claim 1, wherein both the cartridge border and the body border are complementarily shaped, the cartridge border and the body border each identifying a ramp comprising a first edge radially proximal to the axis and a second edge radially distal from the axis.

3. Filtration assembly according to claim 1, wherein the cartridge border is positioned on the stem and/or on the tooth while the body border is positioned in an opposite position with respect to the lug, so as to allow a disengagement between the cartridge members and the body members by a reciprocal rotation.

4. Filtration assembly according to claim 1, wherein the body border is shaped as a double ramp, comprising a first body edge radially distal to the axis and a second body edge radially proximal to the axis and a third body edge radially distal to the axis, wherein the first ramp is defined by the first body edge and by the second body edge and the second ramp is defined by the second body edge and by the third body edge, wherein the cartridge border comprises a first cartridge border and a second cartridge border reciprocally shaped such that the first cartridge border engages the first ramp in a first rotational operation, and the second cartridge border engages the second ramp in a second rotational operation.

5. Filtration assembly according to claim 1, wherein each tooth comprises a tilted cartridge edge to have a tapered shape in a lateral direction, wherein said tilted cartridge edge faces the undercut, wherein each lug comprises a tilted protruding edge.

6. Filtration assembly according to claim 5, wherein the tilted cartridge edge and the tilted protruding edge comprise respectively a cartridge engagement wall and a lug engagement wall.

7. Filtration assembly according to claim 5, wherein the tilted cartridge edge and the tilted protruding edge comprise respectively a cartridge engagement wall and a lug engagement wall.

8. Filtration assembly according to claim 1, wherein the cartridge members, and the body engagement members, lie on an imaginary plane that extends radially spaced apart with respect to the axis.

9. Filtration assembly according to claim 1, wherein the cartridge members comprise two, three or four blocking groups angularly equidistant.

10. Filtration assembly according to claim 1, wherein the filter body comprises a cap body and a cup body wherein the mutual engagement defines the filtration chamber.

11. Filtration assembly according to claim 10, wherein the body members are formed on the cap body.

12. Filtration assembly according to claim 5, wherein the tilted cartridge edge and the tilted protruding edge comprise respectively a cartridge engagement wall and a lug engagement wall lying on an imaginary plane tilted with respect to an imaginary plane orthogonal to the axis to prevent the tooth from slipping on the lug in an axial pulling action.

13. Filtration assembly according to claim 5, wherein the tilted cartridge edge and the tilted protruding edge comprise respectively a cartridge engagement wall and a lug engagement wall lying on an imaginary plane parallel to or inclined with respect to an imaginary plane orthogonal to the axis to prevent the tooth from slipping on the lug in an axial pulling action.

14. Filtration assembly according to claim 1, wherein the filter body comprises a cap body and a cup body wherein the mutual engagement along the axis defines the filtration chamber.

15. Filtration assembly according to claim 10, wherein the body members are formed on the cap body, on a cap collar.

16. Filtration assembly according to claim 5, wherein the tilted cartridge edge and the tilted protruding edge comprise respectively a cartridge engagement wall and a lug engagement wall lying on an imaginary plane tilted with respect to an imaginary plane orthogonal to the axis to prevent the tooth from slipping on the lug in an axial pulling action.

17. Filtration assembly according to claim 1, wherein the body border is shaped as a double ramp, comprising a first body edge radially distal to the axis and a second body edge radially proximal to the axis and a third body edge radially distal to the axis, wherein the first ramp is defined by the first body edge and by the second body edge and the second ramp is defined by the second body edge and by the third body edge, wherein the cartridge border comprises a first cartridge border and a second cartridge border reciprocally shaped such that the first cartridge border engages the first ramp in a first rotational operation, and the second cartridge border engages the second ramp in a second rotational operation.

\* \* \* \* \*